Figure 1:
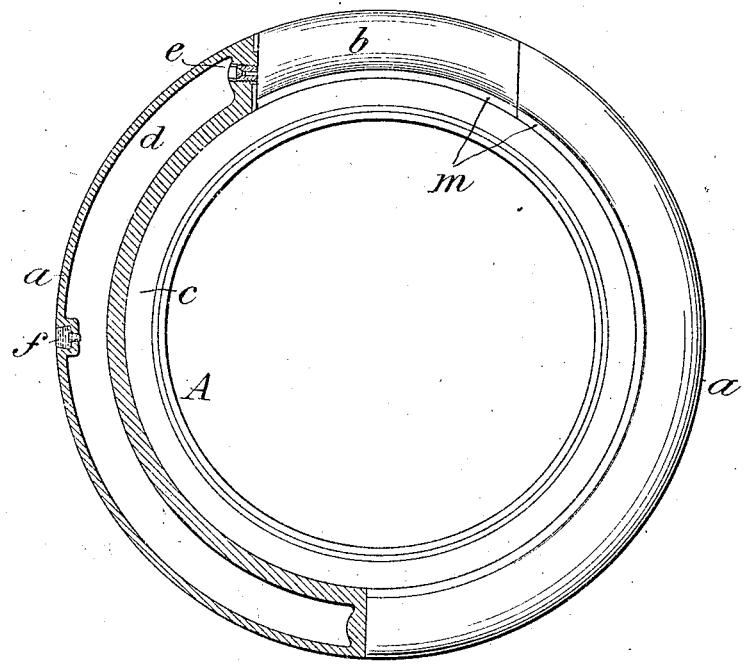

H. Z. COBB.
MANUFACTURE OF TIRE SHOES.
APPLICATION FILED JULY 3, 1914.

1,211,918.

Patented Jan. 9, 1917.
2 SHEETS—SHEET 1.

WITNESSES:
René Bruine
J. J. Wallace

INVENTOR
Henry Z. Cobb,
By Attorneys
O'naser, Dunk & Myers

H. Z. COBB.
MANUFACTURE OF TIRE SHOES.
APPLICATION FILED JULY 3, 1914.

1,211,918.

Patented Jan. 9, 1917.
2 SHEETS—SHEET 2.

Witnesses:
René Buine
J. J. Wallach

Inventor:
Henry Z. Cobb.
by Fraser, Dark & Myers
Attorneys.

UNITED STATES PATENT OFFICE.

HENRY Z. COBB, OF WINCHESTER, MASSACHUSETTS, ASSIGNOR, BY DIRECT AND MESNE ASSIGNMENTS, TO UNITED STATES RUBBER COMPANY, OF NEW BRUNSWICK, NEW JERSEY, A CORPORATION OF NEW JERSEY.

MANUFACTURE OF TIRE-SHOES.

1,211,918.

Specification of Letters Patent. Patented Jan. 9, 1917.

Application filed July 3, 1914. Serial No. 848,766.

*To all whom it may concern:*

Be it known that I, HENRY Z. COBB, a citizen of the United States, residing in Winchester, in the county of Middlesex and State of Massachusetts, have invented certain new and useful Improvements in the Manufacture of Tire-Shoes, of which the following is a specification.

In the manufacture of shoes or casings for pneumatic vehicle tires, it is customary to build up the successive layers thereof on a ring-shaped core or mandrel to which on the exterior the rubber cushion is applied, and then to place the mandrel with its raw shoe in a mold, assembling a series of such molds held together under suitable pressure in a vulcanizing oven, and therein subjecting them to heat for vulcanizing the tire shoes. In this operation it is difficult to insure so close a fit between the raw shoe and the material of the mold as to cause the shoe to completely fill all the interstices of the mold and take a full imprint therefrom. In order to expand the shoe forcibly within the mold, fluid pressure has been introduced into it and maintained during the vulcanizing; this however is subject to the disadvantage that it is necessary to couple pipes leading from a source of compressed air or other fluid, as steam, to the respective mold sections, and to maintain these pipes and couplings in non-leaking condition during the vulcanizing period, which in practice involves much difficulty. In my Patent No. 969,131 of August 30, 1910, is set forth a process wherein the annular mandrel has a liquable rim portion of solidified fluid, such as wax, over which the tire shoe is built up, and which when inclosed in the mold and subjected to the vulcanizing temperature, fuses and its pressure is raised by pumping, or it is withdrawn and replaced by other fluid, as water, so as to maintain a high fluid pressure within the shoe to expand it against the interior of the mold and hold it so expanded during the vulcanizing.

My present invention relates to the vulcanizing of the tire shoe while it is expanded within the mold by fluid pressure. According to my invention, the shoe is built up in any usual manner upon a suitable mandrel; the shoe is then placed in a mold of any ordinary or suitable construction, and confined therein so as to prevent the escape of fluid pressure from within the shoe. A source of fluid pressure is provided which is individual to the shoe or to each shoe to be vulcanized. This source of pressure is sufficient to expand the individual shoe within its mold so as to suitably distend it and force it to conform to the inner face of the mold. At or before the beginning of the vulcanizing treatment, and before any material vulcanization has occurred, the pressure from such source is liberated or admitted within the shoe, and it is confined within the shoe during the vulcanizing. The pressure within the shoe is determined by the amount of fluid provided at such individual source. As compared with the introduction of pressure from one general source to a plurality of shoes being vulcanized, there is avoided the necessity of making coupling or other connections, a leakage of pressure from one shoe affects only that shoe, and the pressure in each shoe is independent of the pressure in the other shoes undergoing vulcanization. The admission of the pressure to the shoe is determined thermostatically, so that it occurs when the temperature approaches or attains the vulcanizing temperature and before the rubber has become sufficiently vulcanized to lose its plasticity. The gas or vapor under pressure is of determinate volume depending upon the charge previously introduced into the chamber. The chamber is preferably a hollow in the mandrel. Preferably air is forced into the chamber to a given pressure, being confined therein until liberated by the action of the thermostatic means, which is a thermostatically actuated valve or a fusible plug. Or a vaporizable liquid such as water may be introduced in measured volume into the chamber, so that on the opening of the thermostatic plug or valve the vulcanizing heat will vaporize the water and generate the required pressure within the shoe.

In the preferred mode of practising my invention I proceed as follows: A suitable number of sectional mandrels are provided each comprising preferably three sections for convenience in removing the mandrel from the finished shoe, as is well understood. In one or more (preferably two) sections of such mandrel, are formed cavities or chambers each having an inlet check-valve through which compressed air is pumped to the required pressure; for example from 75 to 150 lbs., and each having a thermostatic outlet valve adapted to open under a temperature of for example 140 degrees F. This outlet valve is most simply formed of a plug of wax, such as paraffin. Or it may be made of a disk of fusible metal fusing at a similar temperature. Or it may be a tappet or other valve having an expansible plug for forcing it open when this plug expands in approaching the vulcanizing temperature. The segments thus charged with compressed air are fitted together to form a complete ring core or mandrel, and on this is built up the tire shoe with its outer cushion in any usual manner. This is then placed in a mold which is shaped interiorly to give the proper form and pattern to the exterior of the shoe. The segments of mold are clamped or otherwise pressed together. Usually a considerable number of such molds are assembled and held by one clamping means. The molds are placed in any usual vulcanizing oven or chamber, and this is heated up to the customary vulcanizing temperature, and the vulcanizing operation is conducted in precisely the ordinary manner. On reaching the prescribed temperature the fusible plugs or other thermostatic valves in the mandrel sections open and permit the compressed air to blow out from the chambers into the shoe, thereby lifting the shoe away from the mandrel and expanding it outwardly against the inner face of the mold and holding it there during the vulcanizing operation. To insure an air-tight joint the usual inner lining of soft rubber is extended between the inner part or neck of the mandrel and the corresponding faces of the mold, so that this forms a packing to seal the joint between these respective faces and thereby prevent escape of the compressed air. This process has the important practical advantage that it insures the expanding of each individual shoe by introducing within it the required amount of air or other gas at a determined pressure, and does this without the necessity of establishing or maintaining any pipe connections between the mandrel and the reservoir or other source of compressed fluid. It thus does away with at least one pipe and coupling for each tire shoe being vulcanized. It enables the introduction of compressed fluid to be accomplished previously to the forming of the shoes, and at a time when the mandrel segments are separate and each is easily accessible.

Figure 2:
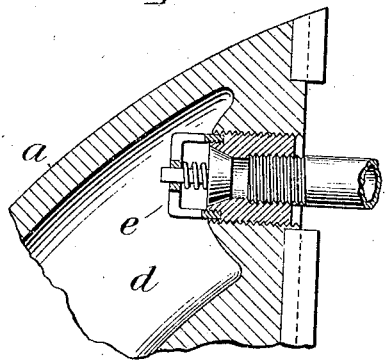
Figure 3:
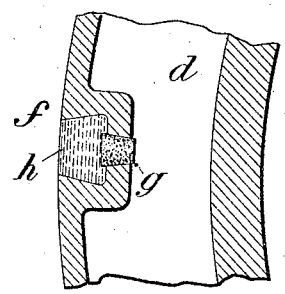
Figure 4:
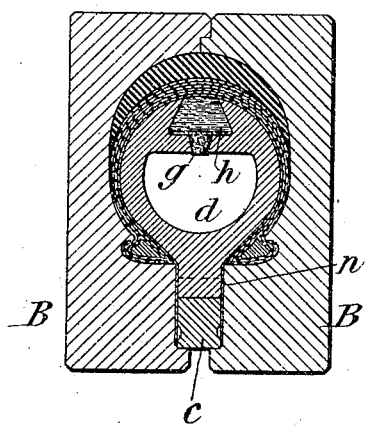
Figure 5:
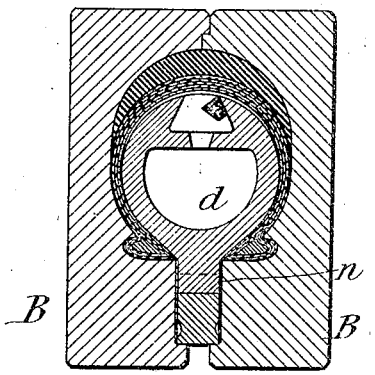
Figure 6:
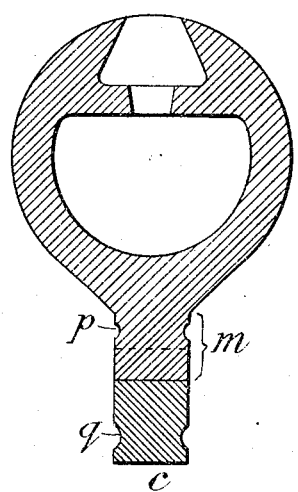
Figure 7:
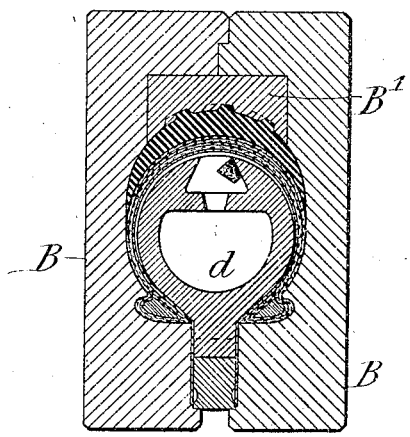
Figure 8:
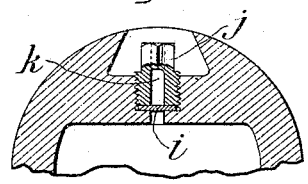

Referring to the accompanying drawings,—Figure 1 is a side elevation of a suitable mandrel for practising this invention, one of the segments thereof being shown in section; Figs. 2 and 3 are fragmentary sections on a larger scale showing respectively the inlet or charging valve and the thermostatic outlet valve; Fig. 4 is a cross-section of the mandrel, shoe and mold ready for vulcanizing; Fig. 5 is a similar cross-section showing the same after the temperature has risen sufficiently to fuse the wax plug and liberate the air pressure so as to expand the shoe; Fig. 6 is a cross-section of the mandrel at the location of the fusible plug or valve; Fig. 7 is a section similar to Fig. 5 but showing a mold with a tread portion distinct from the cheek pieces; Fig. 8 is a section showing a modified fusible valve.

Referring to Fig. 1, the mandrel A is made up of hollow sections $a$ $a$ and a short section $b$; these are united by a ring $c$ within them having any suitable means for attaching the segments to this ring. A suitable construction (not herein illustrated) is that set forth in detail in a companion application for patent for mandrel for vulcanizing tire shoes. Each segment $a$ being made hollow has a chamber $d$ within it. An inlet check-valve $e$ of any suitable construction is applied through which to force air or other gas into the chamber $d$. This valve may be of any usual construction of tire valve, a simple form being that shown, which requires no description. Each segment $a$ has a thermostatic outlet valve $f$ preferably of the simple construction shown in Figs. 3 and 4, wherein a cork $g$, which may be of rubber, is forced tightly into a hole, and a dovetail chamber above it is filled with molten paraffin or other wax to form a fusible plug $h$. Or as a modified construction a fusible disk $i$ (Fig. 8) may be clamped against a seat by introducing a screw plug $j$, so that when the temperature fuses the disk it blows out through the bore $k$.

The mold B is of usual construction, being of annular form and divided centrally so as to form equal halves as shown in Figs. 4 and 5. Or it may have a supplemental tread mold B′ confined within a hollow in the cheek molds as shown in Fig. 7. The latter construction is preferable when the tread of the shoe is to present salient ribs or projections as in the case of anti-skid tires.

As best shown in Fig. 6 the mandrel has an annular neck portion or inner flange $m$ presenting flat faces on opposite sides flush with the flat side faces of the ring $c$. The mold being correspondingly shaped, it is only necessary to extend the inner lining $n$ of the shoe which is of soft rubber inwardly to cover these flat faces, in order thereby to utilize this lining as a packing for making a tight joint between the mold and the mandrel when the faces of the mold are clamped tightly together by the usual means (not shown). To give further assurance of making an air-tight fit, the neck portion $m$ and the ring $c$ (or either of them) are formed with one or more annular grooves $p$ $q$, as best shown in Fig. 6, into which grooves the soft rubber of this lining enters under heat and pressure and affords an effectual seal against the escape of the air or other fluid.

Although the construction thus described is that best adapted for carrying out the process which forms the subject of this application, yet other constructions of mandrel and mold may be used instead. While I prefer the use of compressed air, yet other gases may be substituted, such for example as carbon dioxid. Instead of using air or other fixed gas, vapor may be provided by introducing into the chamber $d$ a quantity of water or other vaporizable liquid, choosing a liquid the vapor of which will not affect the rubber of the tire shoe. A predetermined quantity of water will be introduced such that under the vulcanizing temperature the vapor tension will afford the required pressure.

I claim as my invention:—

1. In the manufacture of tire shoes, building up a shoe upon a mandrel, confining the shoe and mandrel in a mold, providing an individual source of fluid pressure sufficient to expand said shoe within its mold, forming a pressure tight joint between the mandrel and mold near each edge of the shoe, admitting said pressure between the mandrel and shoe, and vulcanizing the shoe while confining said pressure within it.

2. In the manufacture of tire shoes, storing in a chamber associated with a mandrel, a charge of fluid adapted under vulcanizing temperature to afford the required pressure, such mandrel having a neck-portion, and having thermostatic means adapted to open and liberate such charge at a temperature approaching the vulcanizing temperature, building up the shoe on such mandrel with a lining of elastic rubber extended over said neck-portion, placing the mandrel and shoe in a mold fitting the opposite sides of said neck-portion, clamping the mold-sections together so that the extended lining makes a tight joint between said neck-portion and mold, and subjecting to vulcanizing temperature, whereby said thermostatic means opens and liberates the stored medium under pressure within the shoe to expand the shoe within the mold and hold it expanded during vulcanizing.

3. In the manufacture of tire shoes, building up the shoe on a mandrel, providing a source of fluid pressure in thermostatically controlled potential communication with the interior of the shoe, placing the mandrel and shoe in a mold, forming a pressure tight joint between the mandrel and mold near each edge of the shoe, applying heat so as to operate thermostatically to admit pressure from said source into the tire shoe, and continuing the heat until vulcanizing is accomplished.

4. In the manufacture of tire shoes, inclosing the shoe in a sectional mold with an annular neck portion between the mold sections, a lining of yielding rubber being provided extending over such neck portion, clamping the mold sections together so that such lining makes a tight joint between said neck portion and mold, liberating within the shoe fluid under pressure from a source of such pressure individual to the shoe, and sufficient to expand the shoe within its mold and vulcanizing while the shoe is so expanded.

In witness whereof, I have hereunto signed my name in the presence of two subscribing witnesses.

HENRY Z. COBB.

Witnesses:
B. T. MARTIN,
A. T. MARTIN.